US011615262B2

(12) United States Patent
Mathew et al.

(10) Patent No.: US 11,615,262 B2
(45) Date of Patent: Mar. 28, 2023

(54) WINDOW GROUPING AND TRACKING FOR FAST OBJECT DETECTION

(71) Applicant: Texas Instruments Incorporated, Dallas, TX (US)

(72) Inventors: Manu Mathew, Bangalore (IN); Soyeb Noormohammed Nagori, Bangalore (IN); Shyam Jagannathan, Bangalore (IN)

(73) Assignee: Texas Instmments Incorporated, Dallas, TX (US)

( * ) Notice: Subject to any disclaimer, the term of this patent is extended or adjusted under 35 U.S.C. 154(b) by 277 days.

(21) Appl. No.: 16/836,077

(22) Filed: Mar. 31, 2020

(65) Prior Publication Data
US 2020/0226415 A1 Jul. 16, 2020

Related U.S. Application Data

(63) Continuation of application No. 15/205,598, filed on Jul. 8, 2016, now Pat. No. 10,643,101.

(60) Provisional application No. 62/190,537, filed on Jul. 9, 2015.

(51) Int. Cl.
G06K 9/62 (2022.01)
(52) U.S. Cl.
CPC ......... G06K 9/6215 (2013.01); G06K 9/6218 (2013.01); G06K 9/6232 (2013.01)
(58) Field of Classification Search
None
See application file for complete search history.

(56) References Cited

U.S. PATENT DOCUMENTS 9,292,745 B2 * 3/2016 Torii ..................... G06V 20/00
9,842,392 B2 12/2017 De Haan
9,904,867 B2 * 2/2018 Fathi .................... G06V 20/647
(Continued)

OTHER PUBLICATIONS

Benenson, R., et al., "Pedestrian Detection at 100 Frames per Second," CVPR 2013, 8 pages.
(Continued)

Primary Examiner — Nancy Bitar
(74) Attorney, Agent, or Firm — Carl G. Peterson; Frank. D. Cimino

(57) ABSTRACT

Disclosed examples include image processing methods and systems to process image data, including computing a plurality of scaled images according to input image data for a current image frame, computing feature vectors for locations of the individual scaled images, classifying the feature vectors to determine sets of detection windows, and grouping detection windows to identify objects in the current frame, where the grouping includes determining first clusters of the detection windows using non-maxima suppression grouping processing, determining positions and scores of second clusters using mean shift clustering according to the first clusters, and determining final clusters representing identified objects in the current image frame using non-maxima suppression grouping of the second clusters. Disclosed examples also include methods and systems to track identified objects from one frame to another using feature vectors and overlap of identified objects between frames to minimize computation intensive operations involving feature vectors.

20 Claims, 6 Drawing Sheets

(56) References Cited

U.S. PATENT DOCUMENTS

| | | | |
|---|---|---|---|
| 10,013,756 B2* | 7/2018 | Kimmel | A61B 5/6887 |
| 11,393,103 B2* | 7/2022 | Gu | G06T 7/246 |
| 11,403,856 B2* | 8/2022 | Parchami | G06K 9/6218 |
| 2005/0147304 A1* | 7/2005 | Nagahashi | G06V 40/10 382/190 |
| 2006/0126941 A1* | 6/2006 | Higaki | G06V 40/103 382/103 |
| 2009/0087100 A1 | 4/2009 | Hu | |
| 2011/0050938 A1* | 3/2011 | Capata | G06T 7/194 348/222.1 |
| 2011/0274315 A1* | 11/2011 | Fan | G06T 7/277 382/103 |
| 2012/0269384 A1* | 10/2012 | Jones | G06V 20/64 382/103 |
| 2013/0259307 A1* | 10/2013 | Torii | G06V 40/103 382/103 |
| 2015/0222859 A1 | 8/2015 | Schweid et al. | |
| 2017/0011520 A1* | 1/2017 | Mathew | G06V 10/762 |
| 2022/0254162 A1* | 8/2022 | Felemban | G06V 20/49 |

OTHER PUBLICATIONS

Benenson, R., et al., "Seeking the Strongest Rigid Detector," CVPR 2013, http://rodrigo.github.io/documents/2013_09_08_1920_iccv_occulsions_with_supplementary_material.pdf, 17 pages.

Dalal, N., "Finding People in Images and Videos," Polytechnic Institute of Grenoble, INRIA, Rhones-Aples, Jul. 2006, 149 pages.

Dalal, N., et al., "Histograms of Oriented Gradients for Human Detection," Computer Vision and Pattern Recognition, 2005, CVPR 2005, IEEE Computer Society Conference, vol. 1, Jun. 2005, 8 pages.

Dollar, P., et al., "Intergral Channel Features," BMVC 2009, 11 pages.

Dollar, P., et al., "Intergral Channel Features—Addendum," BMVC 2009, 5 pages.

Dollar, P., et al., "Fast Feature Pyramids for Object Detection," Submission to IEEE Transactions on Pattern Analysis and Machine Intelligence, PAMI 2014, 14 pages.

Dollar, P., et al., "The Fastest Pedestrian Detector in the West," BMVC 2010, 11 pages.

Felzenszwalb, P., et al., " Object Detection with Discriminatively Trained Part Based Models," IEEE Transactions an Pattern Analysis and Machine Intelligence, vol. No 9, Sep. 2010, 20 pages.

Ilic, S., "Tracking and Detection in Computer Vision," http://campar.in.turn.de/twiki/pub/Chair/TeachingWs12TDCV/mean_shift.pdf. Technical University of Munich, Winter Semester 2011/2012, 66 pages.

Yamashita, T., et al., "Improved Part-Based Human Detection Using Depth Information," The Institute of Electrical Engineers of Japan, 2010, 7 pages.

Zhu, Q., et al., "Fast Human Detection Using a Cascade of Histograms of Oriented Gradients," TR2006-068, Mitsubishi Electric Research Laboratories, Jun. 2006, 10 pages.

* cited by examiner

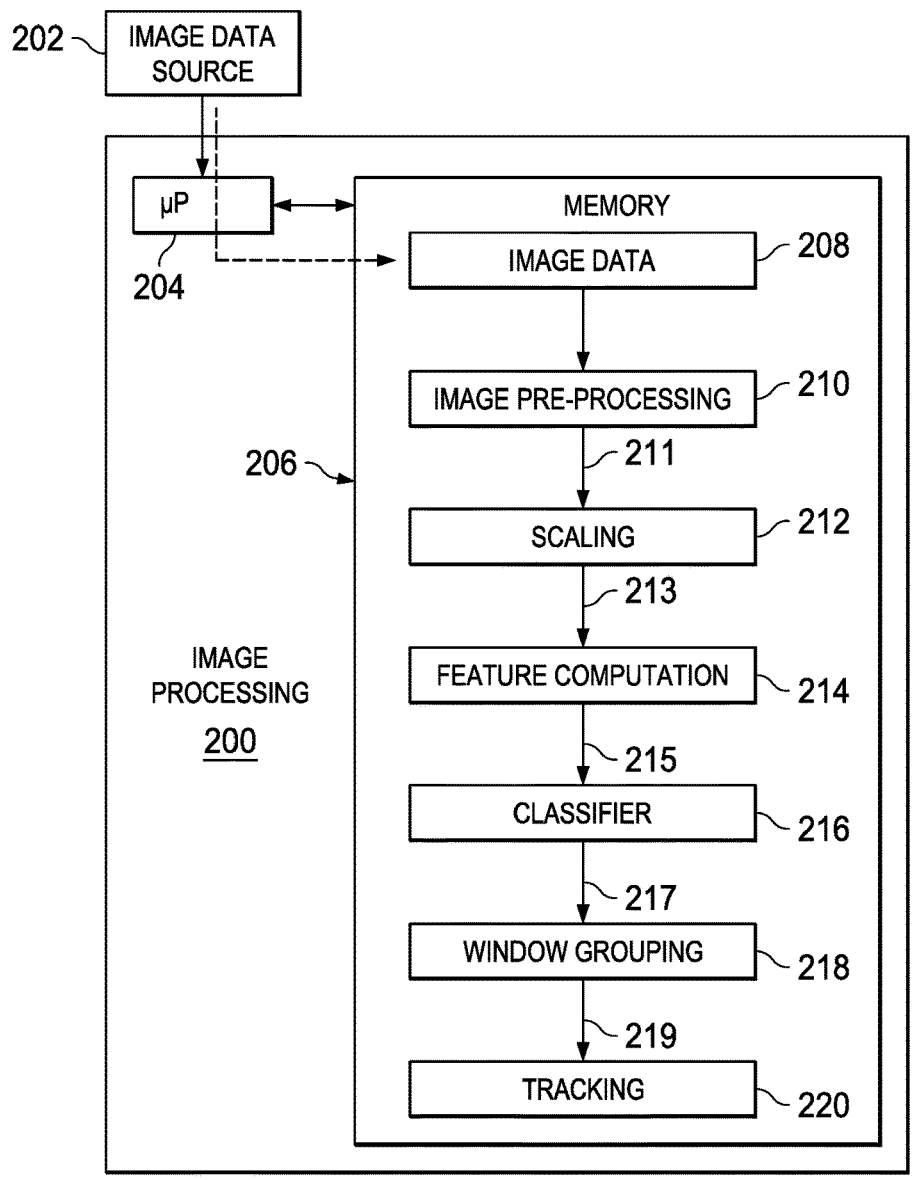
FIG. 2
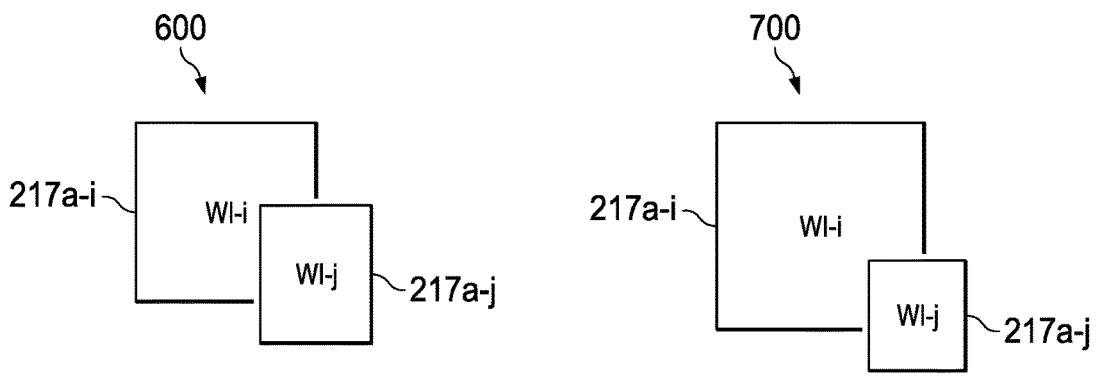
FIG. 6
FIG. 7

WINDOW GROUPING AND TRACKING FOR FAST OBJECT DETECTION

REFERENCE TO RELATED APPLICATION

This application is a continuation of U.S. patent application Ser. No. 15/205,598 filed Jul. 8, 2016, which claims priority to, and the benefit of U.S. Provisional Patent Application Ser. No. 62/190,537 that was filed on Jul. 9, 2015 and is entitled "WINDOW GROUPING AND TRACKING FOR FAST OBJECT DETECTION," which applications are hereby incorporated herein in their entireties.

BACKGROUND

Detecting objects in frames of image data can be useful in a variety of applications. For example, image data from security systems and vehicle-based cameras can be processed to identify and track movement of people or objects. Object detection involves classifying image data to identify candidate windows that may include objects of interest. The classification stage typically will output several candidate windows depending on the classification threshold used. It is important to group these candidate windows into few locations that represent the actual locations of the object. Continuing improvements in video processing, however, are needed to support advanced vehicle control and other real-time applications in which identification and tracking of pedestrians or other objects is important. In particular, the classification step of image object identification yields several candidate windows which are then grouped into a smaller number of locations that represent actual locations of objects in the image data. Non-maxima suppression (NMS) grouping techniques and "mean shift grouping" are two popular window grouping approaches, but neither provides a complete solution for both accurate object identification and tracking, as well as computational efficiency suitable for real-time applications. NMS grouping is particularly suited for single frame detections, but multi-frame applications for object tracking using NMS grouping provide poor temporal consistency in which group locations appear jittery and lacking in smooth movement. Mean shift grouping has good temporal consistency, but it is computationally inefficient, as this technique concurrently determines the number of clusters and finds the cluster centers using iterative techniques typically requiring many iterations. Accordingly, improved solutions for grouping for object identification and location, as well as multi-frame object tracking are desired.

SUMMARY

Disclosed examples include image processing methods and computer readable mediums with executable instructions to process image data. The methods include computing a plurality of scaled data sets according to image data for a current image frame, computing feature vectors for pixel locations or groups of pixel locations of the individual scaled images, classifying the feature vectors to determine sets of detection windows, and grouping the detection windows to identify objects in the current image frame. The grouping includes determining first clusters of the detection windows using non-maxima suppression (NMS) grouping, as well as determining positions of second clusters and scores of the second clusters using a mean shift clustering process according to the first clusters, and determining final clusters representing identified objects in the current image frame using NMS processing of the second clusters. The initial use of NMS processing can be used in certain examples to identify initial groups of detection windows, and the subsequent use of mean shift grouping or clustering on the reduced set of initial groups provides accurate characterization of the object location and facilitates spatial and temporal consistency to support real-time object tracking across multiple frames. The further processing of the second clusters using NMS algorithms removes any further overlapping detection windows.

Certain disclosed examples provide methods for tracking identified objects in a sequence of image frames according to clusters of image data representing identified objects in a current image frame, including determining a set of overlapping clusters in the current image frame having a non-zero amount of overlap with a predicted position of a tracked object from a previous image frame, evaluating only the overlapping clusters to individually determine a similarity of a given overlapping cluster to the tracked object from the previous image frame according to at least one feature vector corresponding to the given overlapping cluster, and storing an updated set of tracked object positions and feature vectors at least partially according to the determined similarities. Further disclosed examples include a computer readable medium with computer executable instructions for implementing the image processing methods.

Image processing systems are disclosed, including a memory and a processor to compute a plurality of scaled images according to image data for a current image frame, compute feature vectors for pixel locations or groups of pixel locations of the individual scaled images, classify the feature vectors to determine sets of detection windows, group the detection windows to identify objects in the current image frame by executing program instructions to determine first clusters of the detection windows using non-maxima suppression grouping processing, determine positions of second clusters and scores of the second clusters using a mean shift clustering process according to the first clusters, and determine final clusters representing identified objects in the current image frame using non-maxima suppression grouping processing of the second clusters.

BRIEF DESCRIPTION OF THE DRAWINGS

FIG. 2 is a schematic diagram of an image processing system.

FIG. 6 is a schematic diagram of slightly overlapping detection windows for which an NMS based grouping algorithm does not suppress the detection windows.

FIG. 7 is a schematic diagram of significantly overlapping detection windows for which the NMS based grouping algorithm suppresses one of the detection windows.

DETAILED DESCRIPTION

Figure 1A:
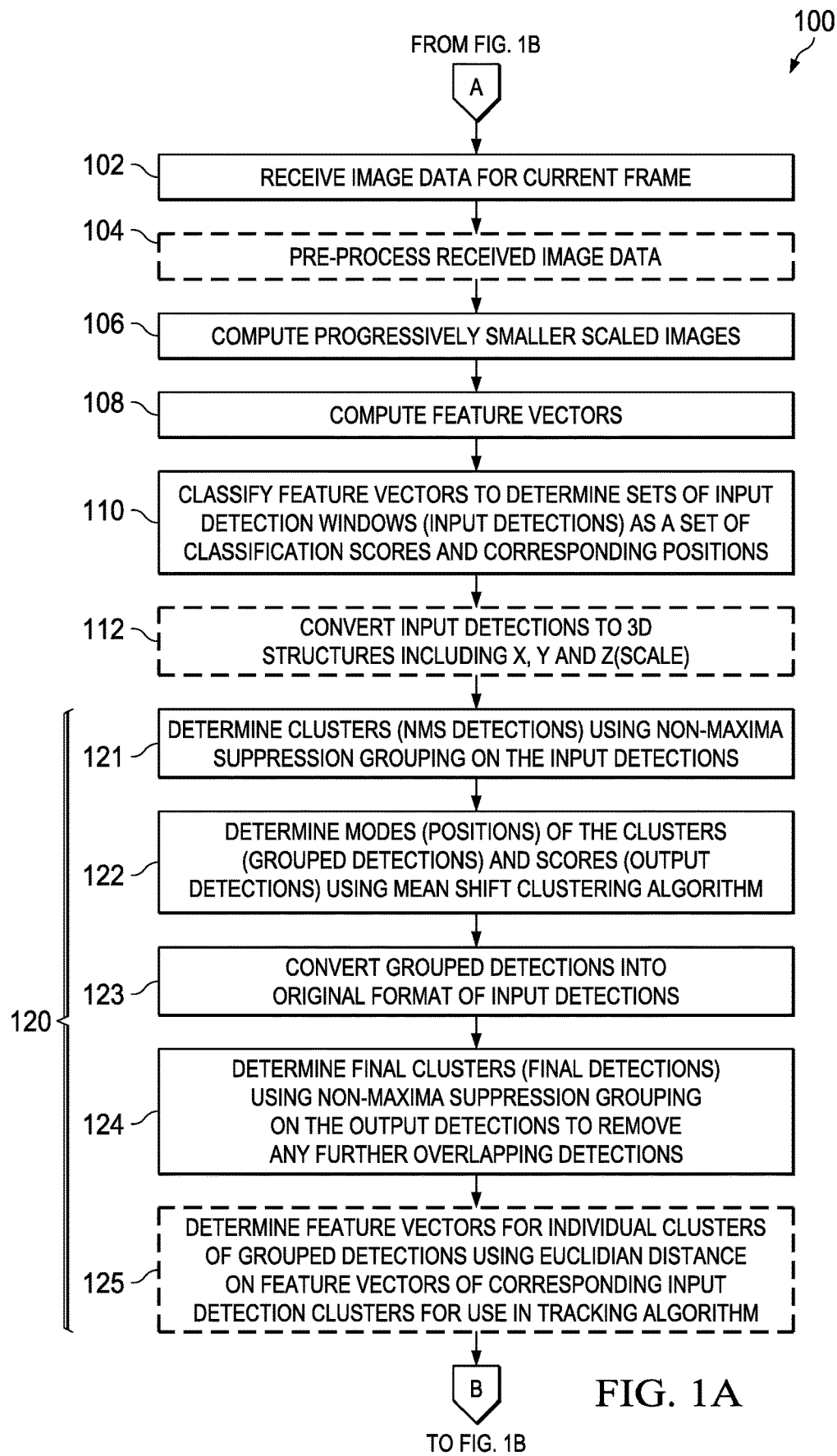
FIGS. 1A and 1B are a flow diagram illustrating an image processing method.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . "

Figure 1B:
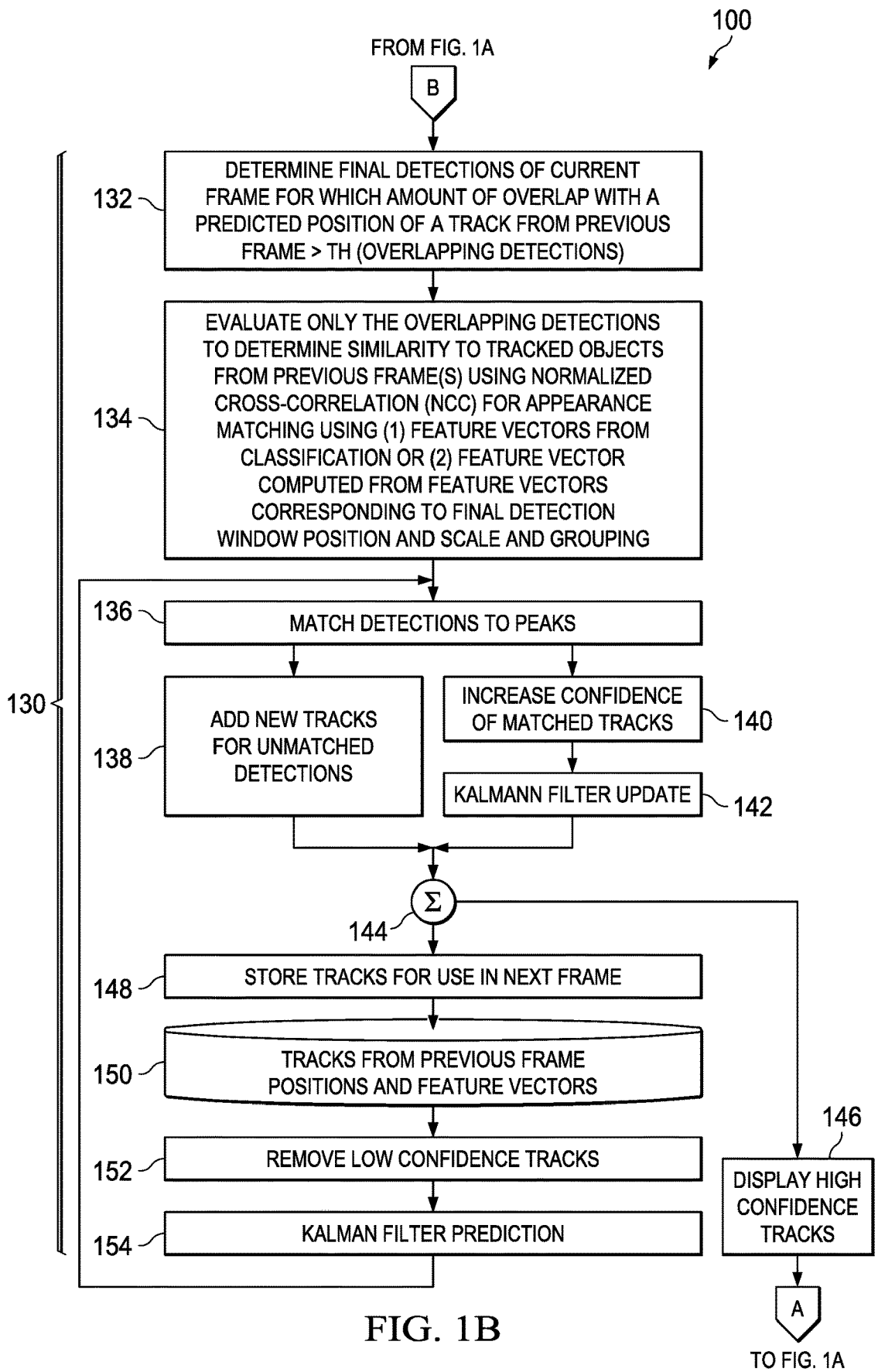

Referring initially to FIGS. 1A, 1B, 2 and 3, disclosed examples include processes or methods 100 and processor-based systems 200 for image processing, including scaling, feature computation, classification and window grouping. Certain implementations further include methods for tracking of identified objects in image data. FIGS. 1A and 1B (collectively FIG. 1) show a method 100 to process image data. The disclosed examples can be implemented in real-time for window grouping in a single image frame and/or tracking for fast object detection and assessment of a stream of image frame the data. The method 100 generally includes scaling at 106, feature vector computation at 108, feature vector classification at 110 to identify detection windows, as well as window grouping at 120 to group the detection windows to identify objects in the current image frame, as well as tracking at 130 (FIG. 1B) to identify high confidence tracked objects across multiple image data frames. In accordance with certain aspects of the present disclosure, the grouping 120 includes determining first clusters of the detection windows at 121 using non-maxima suppression grouping processing, determining positions of second clusters and scores of the second clusters at 122 using a mean shift clustering process according to the first clusters, and determining final clusters representing identified objects in the current image frame at 124 using non-maxima suppression grouping processing of the second clusters. In addition, the illustrated process 100 implements steps 130 for identified object tracking including determining final detection windows of a current frame for which a significant amount of overlap exists with a predicted position of a track from a previous frame, and evaluating only the overlapping detections to implement tracking over multiple image frames. The disclosed techniques can be implemented on any suitable programmed or programmable processing circuitry, such as a digital signal processor (DSP).

Figure 3:
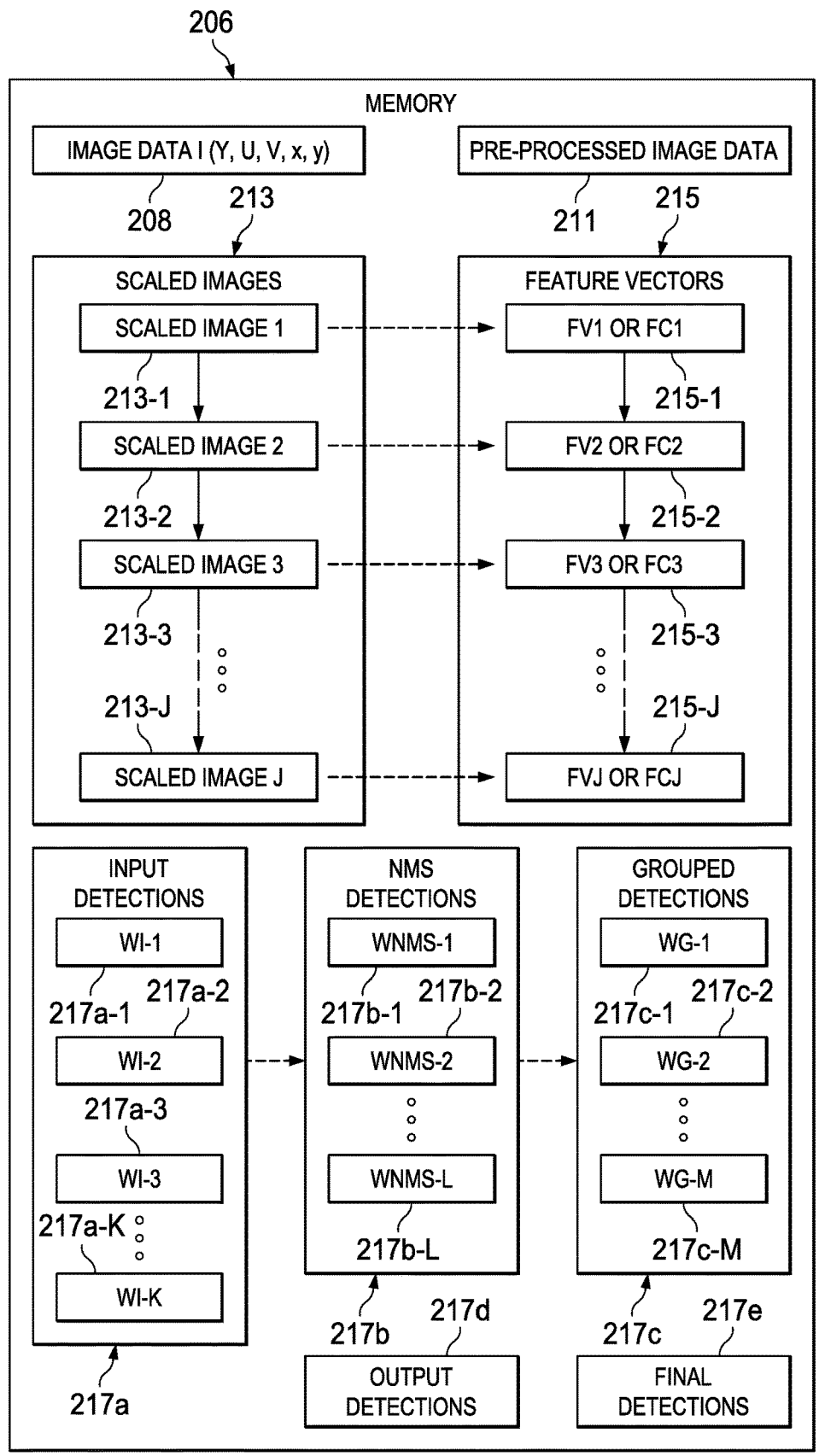
FIG. 3 is a schematic diagram of example image data stored in memory of the image processing system of FIG. 2.
Figure 4:
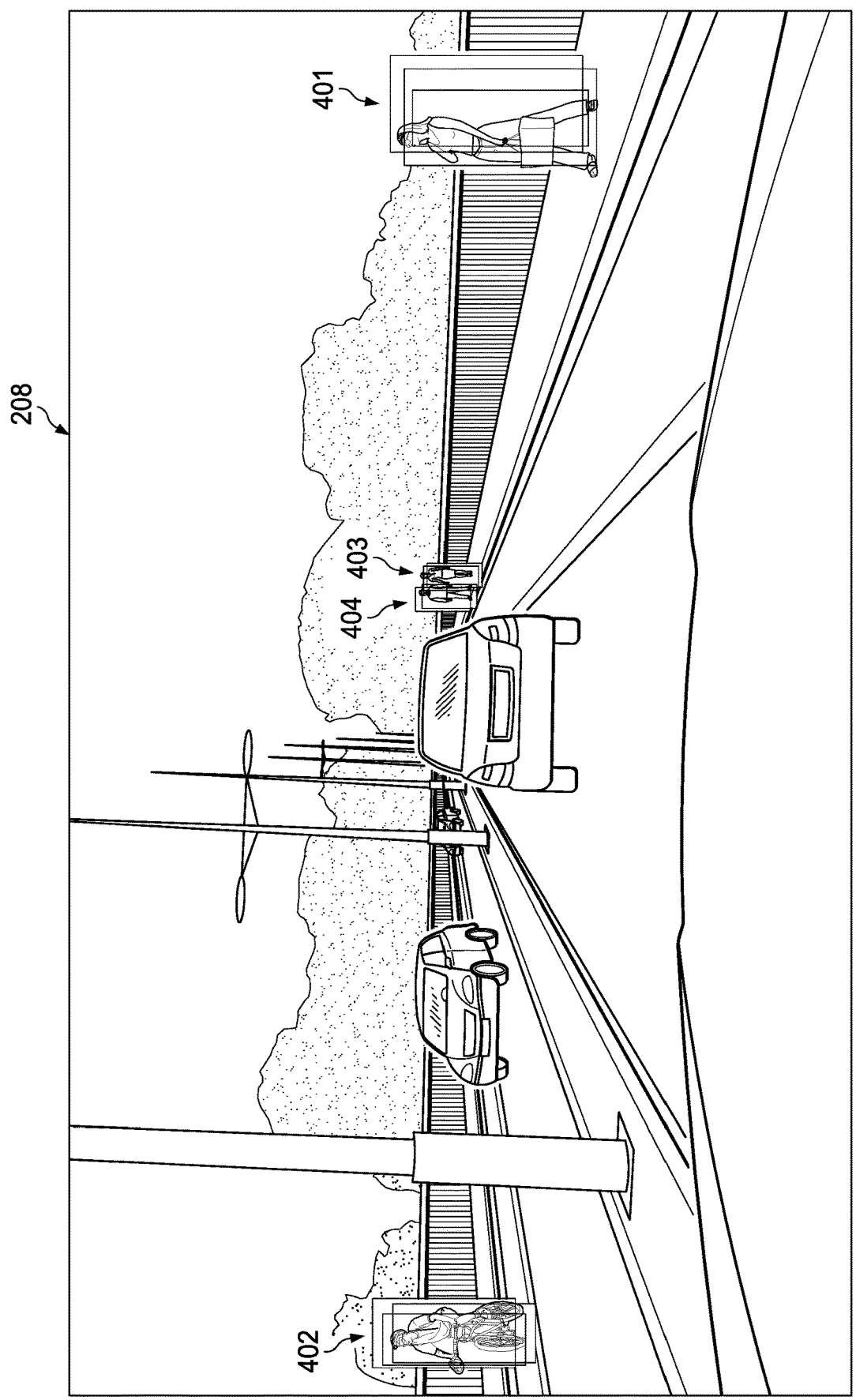
FIG. 4 shows image data with detection windows grouped around identified objects of an image frame.

FIG. 2 illustrates a processor-based image processing system 200 with a processor 200 for receiving input image data from an image data source 204, as well as an electronic memory or other non-transitory computer readable medium. The memory 206 stores image data as well as program instructions executable by the processor 204 to identify objects in an image frame and/or to perform object tracking across multiple image frames. In this example, the image processing system 200 is implemented in an integrated circuit (IC), such as a DSP chip with suitable terminals or interconnections (not shown) to interface with the image data source 202. As shown in FIGS. 2 and 3, the memory 206 stores image data 208, 211, 213, 215, 217, 150 and computer executable program instructions 210-220. The processor 204 is operatively coupled with the memory 206 to execute the program instructions 210-220 to implement the method 100. As shown in FIG. 2, the processor 204 executes image pre-processing program instructions 210 to process the received image data 208 to create pre-processed image data 211. The processor 204 further executes scaling program instructions 212 to compute scaled image data 213, including an integer number "J" scaled image data portions 213-1, 213-2, 213-3, . . . 213-J which are stored in the memory 206 as shown in FIG. 3. Continuing in FIG. 2, the processor 204 executes feature computation program instructions 214 to generate feature vectors 215, including feature vectors or feature cells 215-1 (FV1 or FC1), 215-2 (FV2 or FC2), 215-3 (FV3 or FC3), . . . 215-J (FVJ or FCJ) which can be stored in the memory 206 as shown in FIG. 3. The feature vectors 215 are processed by execution of classifier program instructions 216 in FIG. 2 in order to generate detection windows or clusters 217 thereof that are stored in the memory 206. The processor 204 in FIG. 2 also executes window grouping program instructions 218 and provides output data 219 for use in executing tracking program instructions 220 to track identified objects across multiple image data frames.

At 102 in FIG. 1A, the processor 204 receives image data 208 for a current frame, and stores the image data 208 in the memory 206 as shown in FIGS. 2 and 3. In one example, the processor 204 pre-processes the received image data at 104 and stores the pre-processed image data to 11 in the memory 206 as shown in FIG. 3. The received image data 208 can be of any suitable form, such as values specifying each image location (pixel location) in a particular color space representation, such as the YU color space. In one example, the range for each data value is 0 to 255. The received input image in one example is first padded by 64 pixels on all sides to facilitate detection of people that are too close to the camera. In this regard, some amount of background helps to correctly detect people, and if a detected pedestrian or other object is too close to the camera, additional background is missing and this affect is accommodated by padding. The preprocessing at 104 in one example includes contrast stretching by computing a histogram of the intensity image (luma), and computing minimum and maximum values from the cumulative histogram. In one example, the minimum and maximum values are computed such that 1% of intensity values are below a selected minimum value minVal, and such that 1% of intensity values are above a selected maximum value maxVal. The input intensity pixel value is converted to an output value according to the following equation (1):

$$\text{output}=((\text{input}-\text{minVal})*255/(\text{maxVal}-\text{minVal})). \quad (1)$$

At 106, the processor 204 computes a plurality of progressively smaller scaled images 213 according to image data 208 for a current image frame, and the scaled images 213 can be stored in the memory 206 as shown in FIG. 3. Using a scale factor "s" between 1 and K, where K is selected such that the resultant scaled down image is just larger than the 32×64, the processor 204 scales the pre-processed image 211 according to the scaling instructions 212 using the scale factor s before feature computation and classification is done for each down-sampled scaled image 213-1 through 213-J. In one example, the ratio between successive scales is sqrt (sqrt (sqrt (2)))=1.0905077, and eight scales can be used to reach the next octave (i.e., width/2, height/2). The scaling factor in one example is configurable, and the number of scales J may be reduced with associated reduction in detection quality.

At 108, the processor 204 computes feature vectors 215 for pixel locations or groups of pixel locations of the individual scaled images 213. In one example, processor 204 computes 10 feature images, including 6 orientation bins, a gradient, and the values for Y, U and V at 108. In addition, the processor 204 performs Histogram of Oriented Gradients (HOG) processing as part of the feature computation at 108. In one example, the processor 204 filters the scaled image data 211 with a centered gradient filter [−1, 0, +1] in both horizontal and vertical directions. In one example where parameters h and v respectively correspond to horizontal and vertical gradients at the current pixel location, the processor 204 computes each HOG bin value $\beta=\theta/\Delta$, where $\theta$ is an unsigned orientation angle in the range of zero through $\pi$ and the $-\pi$ to $\pi$ range is converted to 0 to $\pi$ by adding $\pi$ to the angle if the angle is less than zero. The orientation angle $\theta$ and $\Delta$ are respectively given by the following equations (2) and (3):

$$\theta = \tan^{-1}(v/h); \text{ and if } \theta \text{ is } <0, \theta \text{ is set to } \theta + \pi, \text{ and} \qquad (2)$$

$$\Delta = \pi/N, \text{ where } N \text{ is the number of HOG bins.} \qquad (3)$$

In one example, the processor 204 computes the HOG bin value $\beta$ at 108 without computing the ratio v/h and the inverse tangent by computing the following equation (4) to evaluate a term $\epsilon$:

$$\epsilon = h \sin \theta - v \cos \theta. \qquad (4)$$

Using the correct value for $\theta$, the value of $\epsilon$ is zero. The processor 204 in one example determines the HOG bin value $\beta$ that minimizes $\epsilon$ in equation (4) by trying out the $\theta$ values corresponding to all the N HOG bins. The magnitude m at the current pixel location is placed in the channel/plane corresponding to the HOG bin $\beta$. For computational simplification, the processor 204 approximates the magnitude value m in one example using the following equation (5):

$$m = \min(|abs(h)| + |abs(v)|, 255) \qquad (5)$$

In this example, the magnitude m is computed by an approximate method by taking the sum of the horizontal and vertical absolute gradients, and the value m is clipped under 255. In one example, the processor 204 is programmed for N=6 HOG orientation bins, giving rise to 6 HOG channels/planes, and the feature vectors 215 also include gradient, Y, U and V channels for a total of 10 channels/planes to provide 10 images corresponding to 10 feature channels/planes, where the values in all the 10 channels are within the range of 0 to 255.

In one example, the feature planes are converted into feature cells (FCs 215 in FIG. 3). A feature cell FC in one example is an accumulation of feature plane values within an 8×8 cell (different cell sizes can also be used, but 8×8 is chosen here). Such 8×8 cell values FC are computed at every 4×4 offset within the feature planes. The result of these accumulation operations are 10 feature cell images stored as the feature vectors 215 in FIG. 3. It is noted that the feature vectors 215 need not be stored in the memory 206, as certain examples do not perform any further processing on the feature vectors 215. Feature vectors 215 in the illustrated example are 8×8 cells 215 that fit in a 32×64 pedestrian window or range of the image data 208 in which, with a shift of 4 pixels (the last cell actually crosses the 32×64 boundary. This gives (32/4)×(64/4)=8×16 cells in the pedestrian model per channel, and 128 cells per channel in a pedestrian model. For the case of 10 feature channels (6 HOG angle bins, gradient and Y, U, V). This yields a total of 128×10=1280 elements that form the feature vector 215.

At 110 in FIG. 1A, the processor 204 classifies the feature vectors 215 in order to determine sets of detection windows 217a (INPUT DETECTIONS), and the identified detection windows 217 can be stored in the memory 206 as shown in FIG. 3. In one example, the processor 204 processes the feature vectors 215 by a classifier such as Adaboost or Support Vector Machine (SVM) to identify the candidate locations where an object of interest might be present. The candidate locations are referred to herein as detection windows or candidate windows, and include "x" and "y" horizontal and vertical spatial location or position values corresponding to the identified window, as well as a score value "s" representing the scale in which the window was identified (e.g., S=1 through J in the example of FIG. 3). In one example, the feature vector 215 for each location is computed at various regions of interest offsets (ROI offsets) of the scaled image. The processor 204 implements the classifier program instructions 216 in one example to compute the feature vector 215 using a cascade Adaboost classifier with 1280 stages of boosted weak learners. In one example, an ROI offset of 4 pixels is used, although other offsets are possible such as an offset of 8 to reduce the complexity. In this case, an Adaboost learner made up of cascade of decision trees is used for classification. A cascade Adaboost classifier consists of a series of weak learners. The weak learners used for one example are level 2 decision trees. The summation of these scores from all the weak learners gives the final score used for classification. The final score from the overall cascade classifier in one example is given by the following equation (6):

$$\text{score} = \Sigma v_{ik}; \qquad (6)$$

where i=0, 1 . . . N−1, and k is 0 or 1 depending on whether the feather element $n_{(i)}$ used for the $i^{th}$ Tree is less than or greater than a threshold ti. The processor 204 makes a decision by comparing the final cumulative score with a threshold. The decided class in one example is given by whether the score is greater than the threshold or not. The output of classifications stage is the set of classification scores and the position at which those scores were obtained corresponding to input detection windows WI-1, WI-2, WI-3, . . . WI-K stored as the input detections 217a-1, 217a-2, 217a-3, . . . 217a-K as shown in FIG. 3.

At 112, the input detections 217a can optionally be converted to 3-D structures including x, y and z values, where the lowercase Z values represent the scale associated with the detection 217a based on the corresponding scaling at 106.

The processor 204 then implements window grouping program instructions 218 (FIG. 2) at 120 in FIG. 1A to identify the actual locations of the object, and optionally also performs object tracking 130 is shown in FIG. 1B track identified objects over time according to multiple image frames. At 120, the processor 204 groups the detection windows 217a to identify objects in the current image frame. At 120, the detections from various scales are converted into the dimensions at the native scale using the information about the scale and padding. It is observed that several times many adjacent positions are detected as pedestrians or objects of interest, and is desirable to eliminate many of them by grouping window detections that are in fact associated with a single object of interest. Disclosed examples advantageously employ a multistep grouping process 121-125 including initial NMS processing, followed by means shift processing, and a further NMS process in order to facilitate the temporal the consistency advantages of mean shifting along with the computational efficiency of NMS processing.

The grouping at 120 in one example includes determining first clusters of the detection windows at 121 in FIG. 1A. The processor 204 performs NMS grouping 121 and stores the output in a temporary array. These are stored in the memory 206 in one example as NMS DETECTIONS 217b, including an integer number L NMS windows 217b-1 (WNMS-1), 217b-2 (WNMS-2), . . . 217b-L (WNMS-L) using non-maxima suppression (NMS) grouping processing according to the grouping program instructions 218. The NMS processing at 121 advantageously suppresses or eliminates detection windows 217a that are redundant, i.e., that correspond to a single identified object of interest. To do this, the processor 204 performs NMS grouping at 121 using overlap of neighboring windows 217a.

Figure 5:
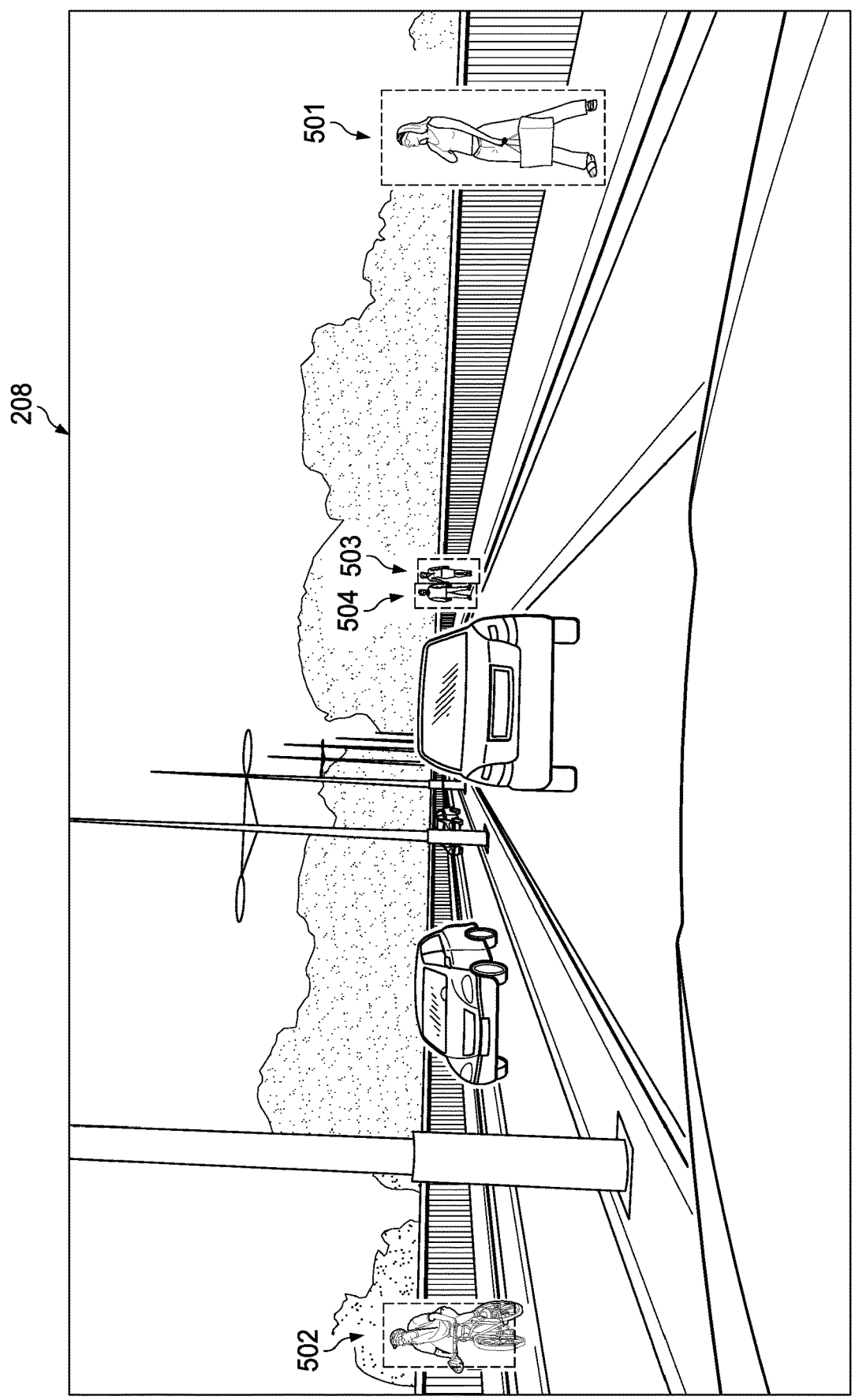
FIG. 5 shows the image frame of FIG. 4 with a reduced set of detection windows around identified objects.

Referring also to FIGS. 4-7, FIG. 4 shows an image data example 208 for a current frame with detection windows 401, 402, 403 and 404 grouped around four corresponding identified objects, in this case pedestrians walking down sidewalks alongside a road. FIG. 5 shows the image frame 208 with a reduced set of detection windows 501, 502, 503 and 504 around the identified pedestrian objects. The NMS processing and 121 advantageously suppresses certain overlapping or redundant detection windows based on overlap of detections. FIG. 6 illustrates an example of two overlapping input detection windows 217a that are slightly overlapping one another in the x, y image field. In this example, the initial NMS based grouping processing at 121 does not suppress the detection windows WI-i and WI-j since the amount of overlap a small. FIG. 7 shows a different situation in which the detection windows WI-i and WI-j significantly one another. In this case, the processor 204 selectively suppresses one of the windows WI-i or WI-j which has a lower classification score, in order to promote singular identification of detection windows in association with corresponding singular identified objects of interest as shown in FIG. 5.

In one example, the processor 204 determines the remaining detections or second clusters 217b at 121, and stores these as NMS DETECTIONS 217b in the memory 206. In one example, for a given cluster or group of detection windows 217a, all the overlapping windows (that overlap with the current window) with classification scores less than that of the current window are removed from the final output. Because the classification processing at 110 tends to produce a lot of detection windows 217a (e.g., INPUT DETECTIONS in FIG. 3), the input to the initial NMS processing at 121 may contain a large number of detection windows in a given cluster. However, due to the NMS process, some detection windows that actually might relate to the underlying objects being detected usually remain. If an integer number N candidate detection windows remain, the processor 204 in one example arranges these in sorted order of decreasing Adaboost classification scores as $W_i$, $I=0, 1, \ldots N-1$ respectively having Adaboost scores $S_i$, $i=0, 1, \ldots N-1$. The processor 204 assesses the amount of overlap Oij for individual pairs of candidate detection windows Wi and Wj according to the following equation (7):

$$Oij=100*\text{area}(Wi \cap Wj)/\min(\text{area}(Wi),\text{area}(Wj)). \quad (7)$$

If the overlap is greater than a threshold value (e.g., Oij>TH), the processor 204 suppresses (e.g., removes from further consideration) the window with the smaller score. In one example, the threshold TH is 65, although any suitable threshold value can be used. In one implementation, the processor 204 implements exhaustive suppression by computing the overlap Oij for all values of i and j. For whichever Oij that exceeds the threshold TH, the window with lowest score is suppressed (not output). In another implementation of the initial NMS grouping at 121, the processor 204 initializes some valid flags $v_i$=true, i=0, 1, . . . N−1, and suppresses unnecessary windows by setting the corresponding valid flag to false using the following logic:

```
For i = 0,1,..N−2
    For j = i+1,1,...N−1
        if (Oij > Th) && (vi==true) && (vj==true)
            v_j = false;
        End
    End
End
```

The processor 204 selects the windows that remain with a valid flag marked as true:

```
k = 0
For I = 0,1,..N−1
    If(vi == true)
        Gk = Wi
        k++
    End
End
```

The above implementation is referred to as a greedy NMS suppression algorithm. NMS grouping by itself is particularly suited for single frame detections, but NMS grouping suffers from poor temporal consistency in which group locations appear jittery and lacking in smooth movement.

At 122 in FIG. 1A, the processor 204 implements further grouping to determine the modes or positions of second clusters (GROUPED DETECTIONS) 217c and scores of the second clusters (OUTPUT DETECTIONS) 217d using a mean shift clustering process according to the first clusters 217b. In one example, the processor 204 uses the first clusters (NMS DETECTIONS) 217b as starting points and computes the mode using mean shift grouping for the input detections 217a. The mean shift is performed in one example using normal distribution for x, y and z, where z is used in the log domain. After a few iterations of mean shift, the processing at 122 yields the output x, y and z in the second clusters 217c (GROUPED DETECTIONS). The processor 204 also computes scores corresponding to the second clusters 217c in the process of mean shifting at 122. The second clusters 217c are then converted at 123 in one example into the format in which the first clusters 217a were provided.

This approach provides the temporal consistency advantages of mean shift clustering with respect to object tracking over multiple frames, where the initial NMS grouping at 121 reduces the complexity of mean shift grouping. The mean shift clustering processes detection windows as N-dimensional observations of vectors to be clustered. In one example, the input detections are three-dimensional values (x, y and s), and the processor 204 executes a "mode" (highest frequency of occurrence) finding algorithm which tries to move each of the detection windows towards the modes (regions with highest density/probability of detection windows) in the vicinity of the original detection window locations. Effectively, this moves or converges the positioning of each of the detection windows associated with a particular group or cluster toward the mode of the cluster. In one example, the processor 204 implements an iterative adjustment procedure using a kernel density estimation function. This will bring several detection windows within a cluster very close together, and then duplicates (or near identical windows) can be removed to output just the cluster centers.

In one implementation, the processor 204 implements the mean shift algorithm by representing the detection windows of the first clusters 217b as a point "P" in 3D space of x, y and s, where the scale s is represented in a log domain in one example, according to the following equation (8):

$$P_i=[x_i,y_i,z_i]=[x_i,y_i,\log(\text{scale})_i]; \, i=0,1 \ldots M-1 \quad (8)$$

where M is the number of detection windows. The processor 204 dilates a density kernel by scale of each point because the position of the detection windows are dependent on the scale according to the following equation (9):

$$[\sigma_{xi},\sigma_{yi},\sigma_{zi}]=[\sigma_x*x_i,\sigma_y*y_i,\sigma_z] \quad (9)$$

where $[\sigma_{xi}, \sigma_{yi}, \sigma_{zi}]$ is the sigma of the density kernel. In one example, typical values of the sigma of the density kernel $[\sigma_{xi}, \sigma_{yi}, \sigma_{zi}]$ are [32/6.0, 64/6.0, log(1.3)]. Any suitable kernel function can be used, such as the Uniform/Box kernel, Normal kernel or Epanechnikov kernel. For example, an Epanechnikov kernel g(x) centered around origin is given by the following equation (10):

$$g(x)=c.(1-\|x\|^2) \text{ for } \|x\|<1, \text{ or } 0 \text{ otherwise} \quad (10)$$

where c is a constant, x represents the 3tuple [x, y, z], and $\|x\|^2$ refers to $(x^2+y^2+z^2)$.

The Epanechnikov kernel centered around the $i^{th}$ point and with scale $[\sigma_{xi}, \sigma_{yi}, \sigma_{zi}]$ is denoted as $g_i(x)$ in the following equation (11):

$$g_i(x)=c.(1-\|x\|^2) \text{ for } \|x\|<1, \text{ or } 0 \text{ otherwise} \quad (11)$$

where $\|x\|^2$ refers to $((x-x_i)/\sigma_{xi})^2+((y-y_i)/\sigma_{yi})^2+((z-z_i)/\sigma_{zi})^2$. The processor 204 sets an initial value for one of the mean values that is to be estimated, designated as $x_m=[x_m, y_m, z_m]$. In one example, the processor 204 sets the mean value $x_m$ as the output of NMS grouping algorithm after applying log to the scale component, and performs a mean shift iteration to determine weights $w_i$ for a predetermined number of iterations (e.g., 20 times) as follows:

$$w_i=g_i(x_m)$$

$$w_i=g_i(x_m).s_i$$

where $s_i$ is the Adaboost score corresponding to the detection $P_i=[x_i, y_i, z_i]$. The original mean shift clustering algorithm does not include the weighting by $s_i$, but the processor 204 uses this in one example to weigh the kernel function as it gives a confidence measure. The processor 204 computes the new mean using the mean shift iteration according to the following equations (12)-(14):

$$\dot{x}_m=(\Sigma_i x_i.w_i)/(\Sigma_i w_i) \quad (12)$$

$$\dot{y}_m=(\Sigma_i y_i.w_i)/(\Sigma_i w_i) \quad (13)$$

$$\dot{z}_m=(\Sigma_i z_i.w_i)/(\Sigma_i w_i) \quad (14)$$

The processor 204 computes the change in mean (mean shift) according to the following iteration equations:

$$d_x=\dot{x}_m-x_m$$

$$d_y=\dot{y}_m-y_m$$

$$d_z=\dot{z}_m-y_z$$

Let $d=d_x^2+d_y^2+d_z^2$
Set $x_m=\dot{x}_m; y_m=\dot{y}_m;$ and $z_m=\dot{z}_m$
If $d<\varepsilon$, then
exit the mean shift iteration
else,
go back to the mean shift iteration The mean shift clustering at 122 computes the number of clusters and also the cluster centers. If mean shift clustering were used without the initial NMS suppression at 121, each detection window would be iteratively adjusted by the mean shift clustering until convergence. The number of detection windows can be large and mean shift grouping alone could involve many iteration cycles which is incompatible with real-time applications for object detection and tracking. In the method 100, the first NMS processing at 121 reduces the number of detection windows that are evaluated by mean shift clustering at 122.

At 123, the processor 204 converts the grouped detections 217c into the original format of the input detections 217a.

At 124 in FIG. 1A, the processor 204 determines final clusters 217e (FINAL DETECTIONS in FIG. 3) representing identified objects in the current image frame using NMS grouping processing of the second clusters 217c, 217d. This further NMS grouping removes any further overlapping detection. The final clusters 217e can be used as identified objects of interest for certain applications. In addition, the final detections 217e for the current frame can serve as inputs to a tracking process 130 (FIG. 1B below) to track objects through time over multiple image frames.

At 125, for each given final cluster 217e of the final clusters 217e, the processor 204 determines at least one feature vector using Euclidean distance on feature vectors of the first detection windows 217a corresponding to the given final cluster 217e. In one example, for all the second clusters 217c, the processor 204 uses the feature vector from the windows/locations corresponding to the input detections 217a by using Euclidean distance. This feature vector is used in the tracking algorithm for correspondence matching from one frame to another.

The grouping at 120 provides an advanced solution suitable for real-time object detection and tracking applications by initially determining the number of clusters using NMS processing at 121 to effectively reduce the hundreds of detections windows into a few candidate object locations before starting the mean shift iteration processing at 122. The NMS algorithm at 121 can be used to find the number of clusters and also provide initial seed points for mean shift iteration at 122. The candidate object locations determined using the initial NMS process 121 are then iteratively optimized via mean shift grouping at 122 to get to the actual cluster center locations.

The method 100 continues at 130 in FIG. 1B to track identified objects in a sequence of image frames according to clusters of image data 217e representing identified objects in the current image frame. At 132, the processor 204 determines a set of overlapping final clusters 217e in the current image frame as a subset of the final clusters 217e having a non-zero amount of overlap with a predicted position of a tracked object from a previous image frame. At 134, the processor 204 evaluates only the overlapping final clusters 217e to individually determine a similarity of a given overlapping final cluster 217e to the tracked object from the previous image frame according to at least one feature vector corresponding to the given overlapping final cluster 217e.

This selective evaluation at 132 and 134 based on overlap facilitates real-time tracking by avoiding evaluation of non-overlapping objects. In this regard, accurate tracking of objects of interest in a series of image data frames is improved by tracking only true objects that are temporally consistent (i.e., objects that are present in several consecutive frames and have a trajectory that follows a smooth and reasonably predictable path). The tracking process 130 also removes false detections and to improve the overall accuracy of the object detector. Temporal consistency is measured using motion and appearance matching, each of which can be implemented using a variety of different techniques. For appearance matching, color histogram (e.g., a histogram of RGB pixels) is a commonly used feature. However, generating color histogram for the grouped object locations in each frame is a computationally intensive task particularly for a large number of tracked objects.

In certain examples, the processor 204 evaluates the overlapping final clusters 217e at 134 using normalized cross-correlation (NCC) processing to determine the similarity to the tracked object from the previous image frame.

In one implementation, the processor computes a feature vector or vectors for the similarity determination according to a feature vector of a position of the given overlapping final cluster 217e. The processor 204 then implements further steps 136-154 of a tracking process as shown in FIG. 1B to track objects of interest over multiple image frames, including storage at 148 of an updated set of tracked object positions and feature vectors 150 at least partially according to the determined similarities.

The processing at 132 and 134 advantageously reduces appearance matching complexity for object tracking. Every detection window has a feature vector associated with it. The feature vector that is used for detection by the classifier at 110 includes information about the appearance of the object as it typically contains image information, gradient and HOG information. In another example, the processor 204 determines the similarity to the tracked object from the previous image frame for appearance matching according to the same feature vector or vectors 215 used in determining the sets of first detection windows 217a. For example, if the feature vector includes 8×16=128 values in each channel and 10 such channels (a channel is one type of information such as luma values or gradient values of one orientation of HOG), then the size of the feature vector is the 128×10=1280. Every detection window has a feature vector associated with it. The feature vector can either be the feature vector that was used to classify that this detection window contains an object (in the scale and position at which it was classified as an object) or it can be obtained by taking the window position and scale after grouping and then fetching the appropriate feature values. Since the feature vector has various kinds of features (HOG, gradient, luma and chroma), the processor 204 in one example first normalizes the feature vector within the channel by normalizing each of the 128 values of a channel inside a feature vector independently. After the normalization, the processor 204 uses a correlation score to assess the similarity of two feature vectors. Effectively, this provides normalized cross correlation (NCC) separately for each channel and the processor 204 and then combines the scores. The resulting score is related to the probability that the evaluated detection corresponds to a track from the previous frame. This reuse of feature vector information and NCC avoids the need for computationally intense methods such as color histograms. The NCC processing itself is also computationally intensive, and the selective evaluation of only the overlapping detections at 132 and 134 further reduces complexity and facilitates use of the method 100 in real time object tracking applications. In one example, a Kalman filter is used to predict the position of the object in the current frame, and a certain amount of overlap is expected between the position predicted by the Kalman filter from the track in the previous frame and the corresponding detection in the current image frame. Thus, the processor 204 initially evaluates window overlap at 132 to determine if there is an overlap between a predicted position of a track from the previous frame and a detection window. If the overlap is higher than a threshold, the NCC is performed at 134.

The further tracking process at 136-154 helps to reduce false detections significantly by eliminating spurious detections that do not have temporal consistency, and helps to temporally smooth the detection windows and fill gaps when detections are sometimes missing. This is beneficial in certain applications, such as the predicting pedestrian movement in a pedestrian detections scenario. The output of the tracking algorithm 130 includes position permission as well as a confidence measure that indicates temporal consistency.

The detection window positions and feature vectors from the current frame are provided to implement the further tracking processing at 136 to match detections with peaks. At 138, the processor selectively adds new tracks for unmatched detections, and selectively increases confidence parameters for matched tracks at 140. The Kalman filter is updated at 142 based on the confidence increases at 140, and the resulting Kalman filter update is supplemented at 144 with the added new tracks for the unmatched detections from 138. This result is displayed in one example at 146 to represent high confidence tracks, and the high confidence track information provided at 146 can be used in a host application, such as vehicle control, obstacle avoidance, monitoring, etc. The processor 200 for also stores the updated tracking information at 148 in a data store 150 along with tracks from the previous frame, positions and feature vectors for use in the next frame. In the illustrated example, the processor 204 also removes low confidence tracks at 152, and generates a new Kalman filter prediction at 154 for use in updating the tracking process for a subsequent image data frame. The illustrated tracking process 130 operates to remove low confidence tracks, as well as to predict the position of the tracks in the new frame by Kalman filter prediction.

The processor 204 matches tracks from the Kalman filter prediction at 154 with detections from the current frame at 134 in one example using appearance matching as well as motion matching. For appearance matching, the processor 204 computes a feature matching score between the feature vector associated with the track (i.e., in a previous frame) and the feature vector associated with the detection in the current frame. The processor 204 implements motion matching by computing a window overlap score between the Kalman filer predicted track location and the detection location. The processor 204 in one example performs feature matching using a normalized cross correlation between the track windows and the mean shift grouped detections (GROUPED DETECTIONS 217c in FIG. 3). The processor 204 selects an association between the track and the detection with the largest score. The processor 204 also performs a temporal overlap check, and those pairs with an overlap less than a threshold are considered to be not associated. After this process some tracks may be left without an associated detection and some detections may not be associated with a track. The processor 204 increases the confidence measure at 140 of a track that received a detection association, and decreases the confidence measure of a track that did not receive an association during the matching at 136. The processor 204 stores the feature vector of the matched detection in the track at 148 so that it can be used for matching in the next frame.

This process is repeated for every frame, with the processor 204 displaying the high confidence tracks at 146 in FIG. 1B, and the process or method 100 returns to receive the next image data frame at 102 in FIG. 1A.

In one example, the detection windows are smoothed using a Kalman filter that predicts and updates position and scale values. In one example, the processor 204 implements the feature matching and Kalman filtering in a closed loop including feature matching using the predicted positions from the tracks. At the end of the feature matching the processor 204 implements the update step to correct the Kalman filters with the new detections. In one example, the processor 204 implements the tracking program instructions 220 (FIG. 2) by evaluating or computing standard Kalman filter equations to do the prediction and update. In one implementation, the processor 204 considers three measurement/output variables (x positions, y position and scale) and 6 state variables in which the three state variables are same as the measurement variables and the three additional variables are the corresponding velocities.

The disclosed methods and systems facilitate implementation of mean shift grouping within the limited computing power available in DSPs or other processors 204 that may be used in implementing vehicle-based or other in situ applications for real time object detection and tracking. This mean shift grouping provides temporal consistency across frames and makes a visually pleasing appearance for object tracking applications. In certain applications, particularly real-time applications with processor's 204 having limited computational capabilities, the advantages of mean shift grouping would not be feasible due to the excessive computational complexity. Furthermore, the use of feature vector information from the classification and grouping processing for appearance matching during tracking processing 130 enables the use of appearance matching in real time tracking solutions.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A method comprising:
receiving, by a processor, an image frame;
computing, by the processor, feature vectors of scaled images of the image frame;
determining, by the processor, detection windows by classifying the feature vectors;
performing, by the processor, non-maxima suppression grouping processing on the detection windows, to produce first clusters; and
performing, by the processor, mean shift clustering processing on the first clusters, to produce second clusters, wherein determining the second clusters comprises processing the first clusters as initial seed values for adjustment by performing the mean shift clustering processing such that only the first clusters are adjusted iteratively, and wherein the mean shift clustering processing includes iterative adjustment of the first clusters by computing a mean of detection windows around the first clusters in accordance with a kernel density estimation function.

2. The method of claim 1, further comprising, performing, by the processor, non-maxima suppression grouping processing on the second clusters, to produce third clusters.

3. The method of claim 2, further comprising:
receiving a first frame, wherein the image frame is a second frame;
determining a subset of the third clusters having a non-zero amount of overlap with a predicted position of a tracked object from the first frame; and
evaluating the subset of the third clusters, to generate an updated set of tracked object positions.

4. The method of claim 3, further comprising:
wherein evaluating the subset of the third clusters is performed according to at least one feature vector corresponding to a cluster of the subset of the third clusters; and wherein the method further comprises storing, by the processor in memory, the updated set of tracked object positions and the at least one feature vector.

5. The method of claim 4, wherein the subset of the third clusters is evaluated by performing normalized cross-correlation to determine a similarity to the tracked object from the first frame.

6. The method of claim 5, wherein the at least one feature vector is at least one of the feature vectors.

7. The method of claim 4, further comprising computing the at least one feature vector according to a feature vector of a position of the cluster.

8. The method of claim 4, further comprising, for the third clusters, determining the at least one feature vector by determining Euclidean distances on feature vectors of the detection windows corresponding to the third clusters.

9. The method of claim 4, further comprising:
storing the second frame in memory; and
retrieving the first frame from the memory.

10. The method of claim 1, further comprising computing a plurality of scaled images according to the image frame.

11. The method of claim 10, further comprising storing the plurality of scaled images in memory.

12. The method of claim 1, wherein a number of the first clusters adjusted by performing the mean shift clustering processing is less than a number of detection windows.

13. A system, comprising:
a processor; and
a non-transitory computer readable storage medium storing a program for execution by the processor, the program including instructions causing the processor to:
receive an image frame;
compute feature vectors of scaled images of the image frame;
determine detection windows by classifying the feature vectors;
perform non-maxima suppression grouping processing on the detection windows, to produce first clusters; and
perform mean shift clustering processing on the first clusters, to produce second clusters, wherein determining the second clusters comprises processing the first clusters as initial seed values for adjustment by performing the mean shift clustering processing such that only the first clusters are adjusted iteratively, and wherein the mean shift clustering processing includes iterative adjustment of the first clusters by computing a mean of detection windows around the first clusters in accordance with a kernel density estimation function.

14. The system of claim 13, wherein the instructions further comprise instructions to perform non-maxima suppression grouping processing on the second clusters, to produce third clusters.

15. The system of claim 14, wherein the instructions further comprise instructions to:
receive a first frame, wherein the image frame is a second frame;
determine a subset of the third clusters having a non-zero amount of overlap with a predicted position of a tracked object from the first frame; and
evaluate the subset of the third clusters, to generate an updated set of tracked object positions.

16. The system of claim 15:
wherein evaluating the subset of the third clusters is performed according to at least one feature vector corresponding to a cluster of the subset of the third clusters; and
wherein the instructions further comprise instructions to store, in the non-transitory computer readable storage medium, the updated set of tracked object positions and the at least one feature vector.

17. The system of claim 16, wherein the at least one feature vector is at least one of the feature vectors.

18. The system of claim 16, wherein the instructions further comprise instructions to compute the at least one feature vector according to a feature vector of a position of the cluster.

19. The system of claim 15, wherein the instructions further comprise instructions to, for the third clusters, determine at least one feature vector by determining Euclidean distance on feature vectors of the detection windows corresponding to a cluster.

20. A non-transitory computer readable storage medium storing a program for execution by a processor, the program including instructions to cause the processor to:
receive a first frame;
receive an image frame as a second frame;
compute feature vectors of scaled images of the image frame;
determine detection windows by classifying the feature vectors;
perform non-maxima suppression grouping processing on the detection windows, to produce first clusters;
perform mean shift clustering processing on the first clusters, to produce second clusters; and
perform non-maxima suppression grouping processing on the second clusters, to produce third clusters;
determine a subset of the third clusters having a non-zero amount of overlap with a predicted position of a tracked object from the first frame; and
evaluate the subset of the third clusters, to generate an updated set of tracked object positions.

* * * * *